United States Patent
Sämann

(10) Patent No.: US 8,746,955 B2
(45) Date of Patent: Jun. 10, 2014

(54) SCREW MACHINE WITH AT LEAST ONE EXTENSION-KNEADING ELEMENT IN A FLOW DIRECTION

(75) Inventor: Hans-Joachim Sämann, Bietigheim-Bissingen (DE)

(73) Assignee: Coperion GmbH, Stuttgart (DE)

( * ) Notice: Subject to any disclaimer, the term of this patent is extended or adjusted under 35 U.S.C. 154(b) by 979 days.

(21) Appl. No.: 12/831,799

(22) Filed: Jul. 7, 2010

(65) Prior Publication Data
US 2011/0007598 A1 Jan. 13, 2011

(30) Foreign Application Priority Data
Jul. 10, 2009 (EP) .................................. 09008998

(51) Int. Cl.
*B29B 7/48* (2006.01)
*B29C 47/64* (2006.01)
(52) U.S. Cl.
USPC .............................................. 366/82; 366/85
(58) Field of Classification Search
USPC .................. 366/79–91; 425/204, 208, 209
See application file for complete search history.

(56) References Cited

U.S. PATENT DOCUMENTS

| | | | | |
|---|---|---|---|---|
| 5,302,106 A * | 4/1994 | Nogossek | ...................... | 425/204 |
| 6,048,088 A | 4/2000 | Haring et al. | | |
| 6,116,770 A * | 9/2000 | Kiani et al. | ...................... | 366/82 |
| 6,170,975 B1 * | 1/2001 | Andersen | ......................... | 366/82 |
| 6,447,156 B2 * | 9/2002 | Maris | ............................. | 366/82 |
| 6,682,213 B2 * | 1/2004 | Inoue et al. | ................... | 366/76.4 |
| 2001/0019729 A1 * | 9/2001 | Inoue | ............................. | 425/204 |
| 2001/0031289 A1 * | 10/2001 | Maris | ............................. | 425/204 |
| 2005/0013192 A1 | 1/2005 | Kakizaki et al. | | |
| 2007/0177451 A1 * | 8/2007 | Benjamin et al. | ............... | 366/82 |
| 2011/0007598 A1 * | 1/2011 | Samann | ......................... | 366/82 |
| 2011/0063940 A1 * | 3/2011 | Padmanabhan | ................. | 366/82 |

FOREIGN PATENT DOCUMENTS

| | | |
|---|---|---|
| EP | 0 330 308 A1 | 8/1989 |
| EP | 0 422 272 A1 | 4/1991 |
| EP | 0 522 390 B2 | 1/1993 |
| EP | 0 875 356 A2 | 11/1998 |
| WO | WO 00/20189 A1 | 4/2000 |
| WO | WO 00/44548 A1 | 8/2000 |
| WO | WO 2008/065860 A1 | 6/2008 |

OTHER PUBLICATIONS

Potente H Et al: "Mischelemente in neuen Geometrien" Kunststoffe, Carl Hanser Verlag, Munchen, DE. Apr. 1, 1998, p. 494-499.
European Search report for related patent application, Feb. 2010.

* cited by examiner

*Primary Examiner* — Charles Cooley
(74) *Attorney, Agent, or Firm* — James B. Conte; Husch Blackwell LLP

(57) ABSTRACT

In a screw machine, to extend the material to be prepared with the latter, at least one processing element is configured as an extension-kneading element, the crest region of which has a reduced thickness compared to a flank region and, with adjacent processing elements, forms an extension channel for the material in the region between the triangles, which tapers in cross section in the flow direction of the material. Because of the tapering of the extension channel, the material is accelerated in the flow direction thereof and extended, so that high-molecular particles in the material are divided and the latter is therefore homogenized.

16 Claims, 8 Drawing Sheets

SCREW MACHINE WITH AT LEAST ONE EXTENSION-KNEADING ELEMENT IN A FLOW DIRECTION

FIELD OF THE INVENTION

The invention relates to a screw machine, in particular an extruder, with a housing, two housing bores, which have mutually parallel axes and intersect one another with the formation of triangles, a first and a second shaft, which are arranged in the housing bores concentrically with respectively associated axis, and a plurality of first and second processing elements for processing material, which are arranged rotatably fixed in an axial direction one behind the other on the respectively associated first and second shaft and are configured tightly meshing with one another.

BACKGROUND OF THE INVENTION

Screw machines of this type are used to prepare plastics materials and are, for example, known from EP 0 522 390 B2. The plastics material to be prepared is subjected to shear flows in these screw machines and thus melted, mixed and homogenized. To avoid thermally damaging shear peaks, the kneading discs of EP 0 522 390 B2 have an enlarged passage cross section produced by material removal in the axial direction. The drawback is that plastics materials with high-molecular particles can only be inadequately homogenized with the forced shear flows, so so-called spots—also called "white spots"—remain in the materials.

SUMMARY OF THE INVENTION

The invention is therefore based on the object of developing a screw machine of the generic type in such a way that plastics materials with high-molecular particles can also be adequately homogenized and so-called white spots avoided.

This object is achieved according to the invention by a screw machine, in which at least one of the processing elements is configured as an extension-kneading element, a crest region of the extension-kneading element has a thickness in the axial direction, which is reduced relative to a flank region, the crest region, together with adjacent processing elements, forms an extension channel for the material in a region between the triangles, and the crest region is configured to extend the material in a flow direction thereof in such a way that the extension channel tapers in the cross section counter to a direction of rotation. Owing to the extension-kneading element according to the invention, the material to be prepared can be subjected to an extension flow during melting, by means of which materials, which cannot be adequately mixed and homogenized by shear flows, can also be mixed and homogenized. Materials of this type are, for example, inhomogeneous polymer melts, which also contain high-molecular particles. The extension-kneading element, because of its configuration, allows simultaneous melting and extension of the material, so the high-molecular particles are effectively divided and the material is correspondingly homogenized. The extension of the material takes place in the region between the triangles, where the extension-kneading element, together with adjacent processing elements, forms an extension channel. As the extension channel tapers in cross section counter to the direction of rotation of the extension-kneading element, in other words tapers in cross section in the flow direction of the material, the material, on entry into the extension channel, has a lower flow speed than on leaving the extension channel, so the material is accelerated along the extension channel and is thus extended in the flow direction. The tapering of the extension channel from the inlet cross section to the outlet cross section may, in principle, be achieved with any geometry of the extension-kneading element in the crest region. The extension-kneading element is preferably configured as a disc.

A configuration of the extension-kneading element, in which a crest region front side facing a material feed is recessed in the axial direction relative to a flank region front side and in which a crest region rear side remote from a material feed and a flank region rear side align with one another, leads to an optimized homogenizing effect.

A configuration, in which a thickness in the crest region proceeding from a first flank of the extension-kneading element up to a second flank is reduced, ensures that a continuous extension channel is configured when the crest region is arranged in a rotary position centrally between the triangles.

A configuration, in which a crest region base is substantially parallel to a flank center plane and in which the crest region front side is configured obliquely rising counter to the direction of rotation relative to a crest region rear side, leads to an optimized homogenizing effect. Moreover, an optimum ratio of extension, shearing and axial conveying effect of the material is achieved.

A configuration, in which the ratio of a smallest thickness to a largest thickness in the crest region is in the range of 1/10 to 9/10, in particular in the range of 2/10 to 8/10, and in particular in the range of 3/10 to 7/10, ensures an optimum extension flow. Owing to the ratio of the smallest thickness to the largest thickness in the crest region, the difference between the flow speed on entering the extension channel and on leaving the extension channel can be substantially adjusted. As the extension of the material results from this difference or acceleration of the material, the extension of the material can thus be adjusted.

A configuration, in which the ratio of a largest thickness in the crest region to a largest thickness in the flank region is in the range of 3/10 to 9/10, in particular in the range of 4/10 to 8/10, and in particular in the range of 6/10 to 8/10, ensures an adequately large outlet cross section of the extension channel, so a maximum permissible flow speed on leaving the extension channel or a maximum permissible acceleration in the extension channel is not exceeded.

A configuration, in which the extension-kneading element is configured as a single-flight to triple-flight disc and in which the extension-kneading element is configured as a double-flight disc, leads to an optimized homogenizing effect.

An extension-kneading zone may be flexibly configured depending on the material to be prepared by a configuration, in which a plurality of extension-kneading elements are arranged on the shafts directly one behind the other and next to one another.

A screw machine, in which a plurality of extension-kneading elements are configured in one piece as an extension-kneading block, is easy to assemble.

Further features, advantages and details of the invention emerge from the following description of an embodiment.

DESCRIPTION OF THE PREFERRED EMBODIMENT

Figure 1:
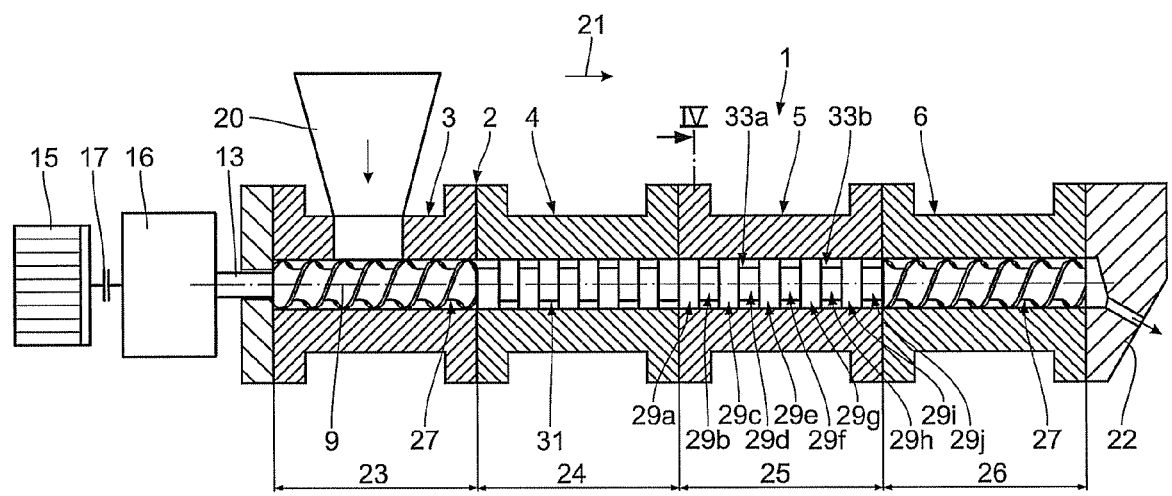
FIG. 1 shows a schematic view of a screw machine configured as an extruder.
Figure 2:
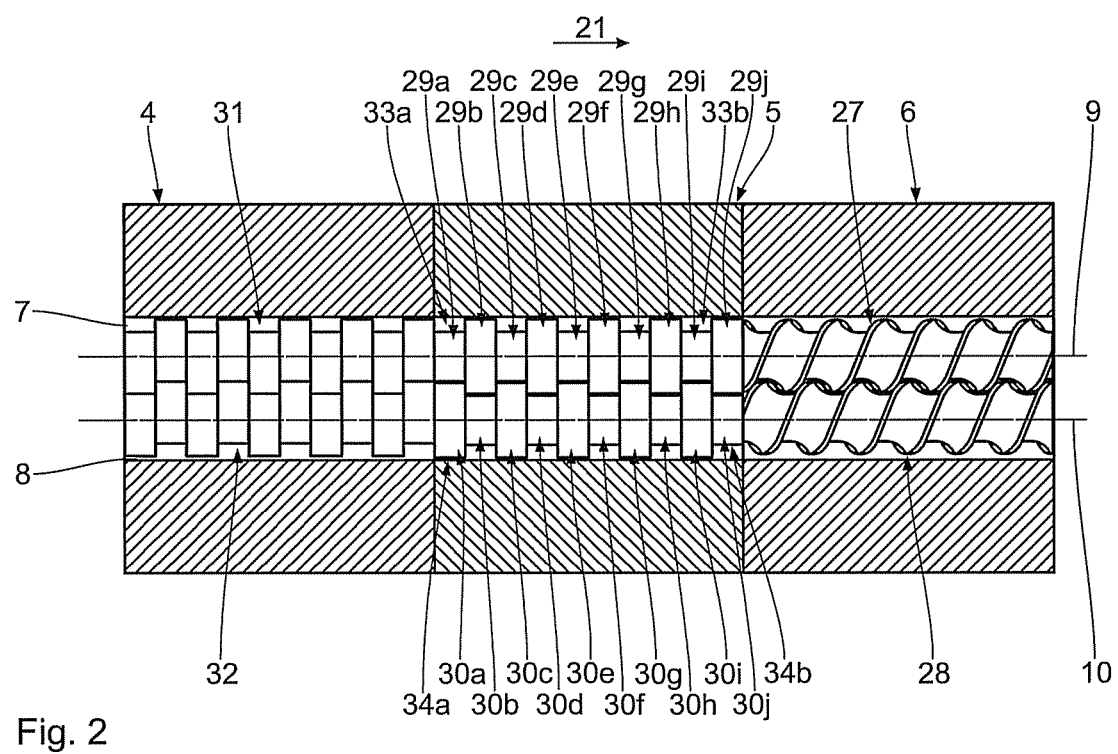
FIG. 2 shows a horizontal part longitudinal section through the extruder in FIG. 1.

A screw machine 1 configured as twin-shaft extruder has a housing 2 made of a plurality of housing portions 3, 4, 5, 6 arranged one behind the other and called housing sections. In the housing 2, a first housing bore 7 and a second housing bore 8 penetrating it are configured, the associated axes 9, of which extend parallel to one another. In the penetration region of the housing bores 7, 8, the housing portions 3 to 6 have an upper first triangle 11 and a correspondingly configured lower second triangle 12.

Shafts 13, 14, which can be rotationally driven by a drive motor 15, are arranged in the housing bores 7, 8 concentrically with the respectively associated axis 9, 10. A branching gearing 16 is arranged between the shafts 13, 14 and the drive motor 15, a coupling 17 being in turn arranged between the drive motor 15 and the branching gearing 16. The shafts 13, 14 are driven in the same direction, in other words in the same directions 18, 19 of rotation.

Arranged on the first housing portion 3 adjacent to the branching gearing 16 is a material feed 20 in the form of a funnel, by means of which plastics material to be prepared or to be processed can be fed into the housing bores 7, 8. The material is conveyed in a conveying direction 21 from the first housing portion 3 up to the last housing portion 6 through the housing 2 and leaves the extruder 1, for example through a nozzle plate 22 closing the housing 2.

The extruder 1, in the conveying direction 21, one behind the other, has a feed zone 23, a melting zone 24, an extension-kneading zone 25 and a pressure build-up zone 26. Arranged on the shafts 13, 14 configured as toothed shafts—one behind the other in the conveying direction 21—are identically configured screw elements 27, 28 in each case associated with one another pairwise, kneading elements 31, 32, extension-kneading elements 29, 30 and, in turn, screw elements 27, 28, in each case as processing elements. Both the screw elements 27, 28 and the kneading elements 31, 32, as well as the extension-kneading elements 29, 30, engage in one another, in other words are configured tightly meshing.

The extension-kneading elements 29, 30 are distinguished below in accordance with their arrangement on the first shaft 13 or the second shaft 14 as a first extension-kneading element 29 and a second extension-kneading element 30. Ten first extension-kneading elements 29a to 29j are arranged directly one behind the other on the first shaft 13, five extension-kneading elements 29a to 29e and 29f to 29j in each case being configured in one piece as first extension-kneading blocks 33a and 33b arranged one behind the other. Ten second extension-kneading elements 30a to 30j are arranged in a corresponding manner on the second shaft 14, five second extension-kneading elements 30a to 30e and 30f to 30j being configured in one piece in each case as second extension-kneading blocks 34a and 34b arranged one behind the other.

The extension-kneading blocks 33a and 33b or 34a and 34b are configured in such a way and arranged relative to one another on the shafts 13, 14 that, in each case, two extension-kneading elements 29a to 29j or 30a to 30j arranged directly one behind the other have an offset angle a about the respective axis 9, 10 of 90°.

The extension-kneading elements 29a to 30j are identically configured, so only the extension-kneading element 29a is described more precisely below. The extension-kneading element 29a is configured as a double-flight disc and accordingly has two crests 35, 36 with a crest angle k and two flanks 37, 38 with a flank angle f. A crest-center plane K runs centrally through the crests 35, 36 and the axis 9. Accordingly, a flank center plane F runs centrally through the flanks 37, 38 and the axis 9. The extension-kneading element 29a is configured with an angle of symmetry s of 180° rotationally symmetrically about the axis 9.

The extension-kneading element 29a, in the crest regions 39, 40, has a thickness $D_K$ in the axial direction, which is reduced relative to a thickness $D_F$ of a flank region 41. For this purpose, the crest region front sides 42, 43 facing the material feed 20 are configured returning relative to a flank region front side 44 in the axial direction, so extension recesses 45, 46 are formed in the crest regions 39, 40. The crest region rear sides 47, 48 remote from the material feed 20 align with a flank region rear side 49. Configured by the extension recesses 45, 46 are crest region bases 50, 51, which extend substantially parallel to the flank center plane F and perpendicular to the crest center plane K. The thickness $D_K$ in the crest regions 39, 40, proceeding from the first flank 37 via the entire crest angle k to the second flank 38, is reduced in comparison to the thickness $D_F$, so the extension recesses 45, 46 extend over the entire crest regions 39, 40. The crest region front side 42 extends in a first portion 52 facing the flank 37 rising obliquely relative to the crest region rear side 47 counter to the direction 18 of rotation. A second portion 53 facing the flank 38 extends substantially parallel to the crest region rear side 47. Correspondingly, the first portion 52 of the crest region front side 43 extends rising obliquely relative to the crest region rear side 48 and the second portion 53 facing the flank 37 extends substantially parallel to the crest region rear side 48.

Figure 3:
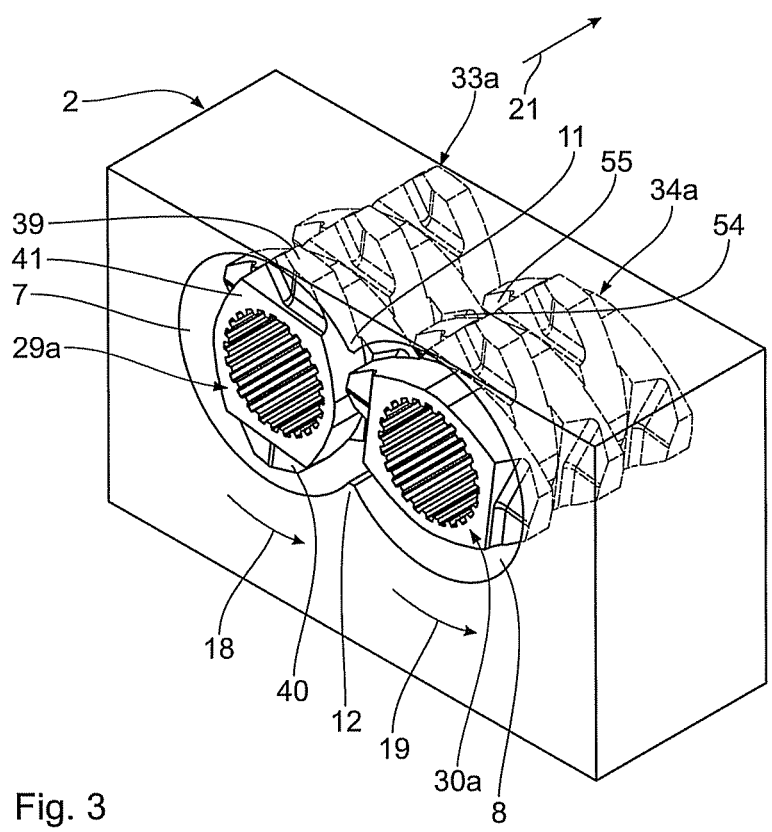
FIG. 3 shows a perspective view of an extension-kneading zone of the extruder in FIG. 1.
Figure 4:
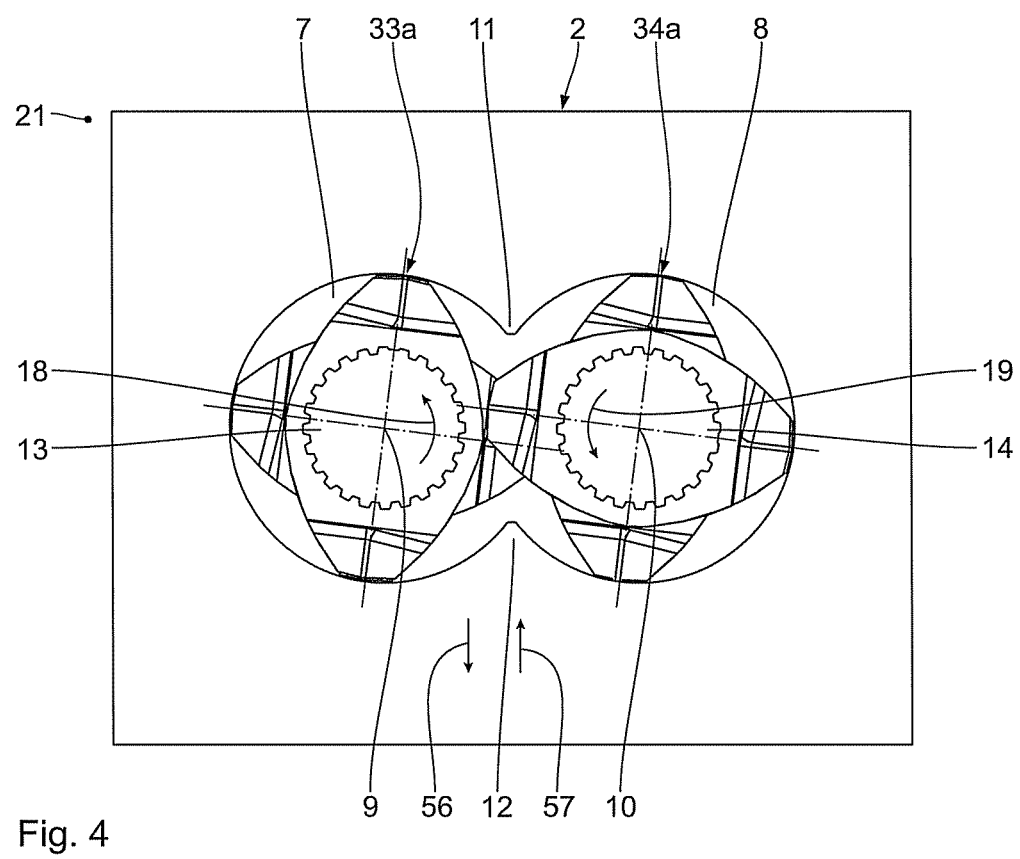
FIG. 4 shows a vertical cross section through the extension-kneading zone of the extruder according to the section line IV-IV in FIG. 1.

If some of the extension-kneading elements 29a to 30j are located in a rotary position, in which their crest regions 39, 40 are located between the triangles 11, 12, groups of three respective extension-kneading elements 29a to 30j form extension channels 54, 55 for the material to be prepared in the region between the triangles 11, 12. This is illustrated by way of example in FIG. 5 for the rotary position shown in FIGS. 3 and 4.

Figure 5:
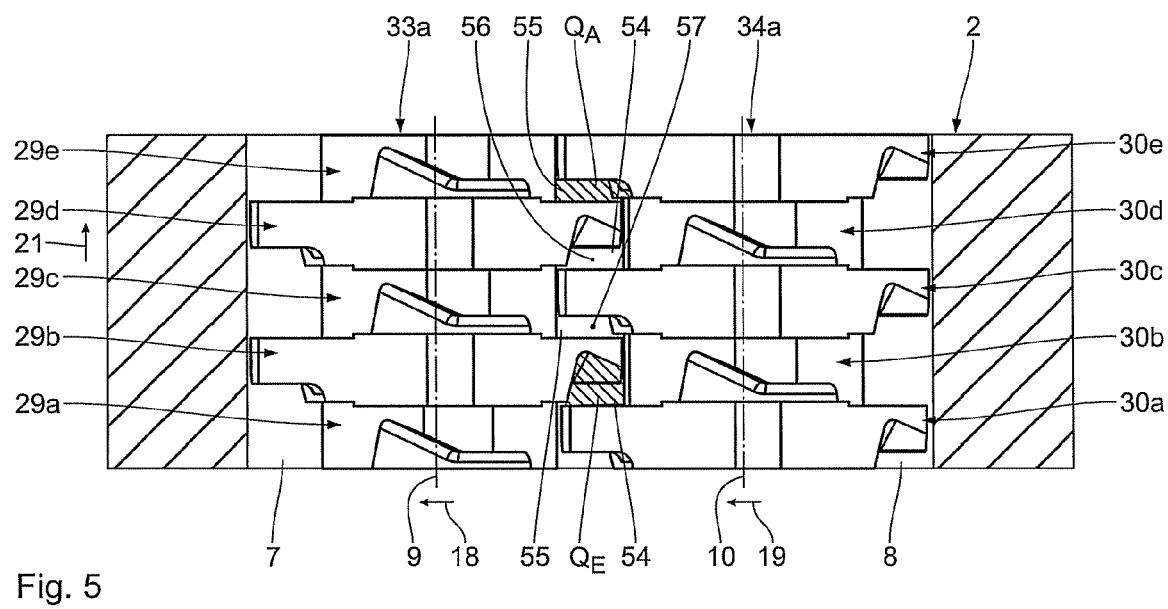
FIG. 5 shows a horizontally cut plan view of the extension-kneading zone in FIG. 2.
Figure 6:
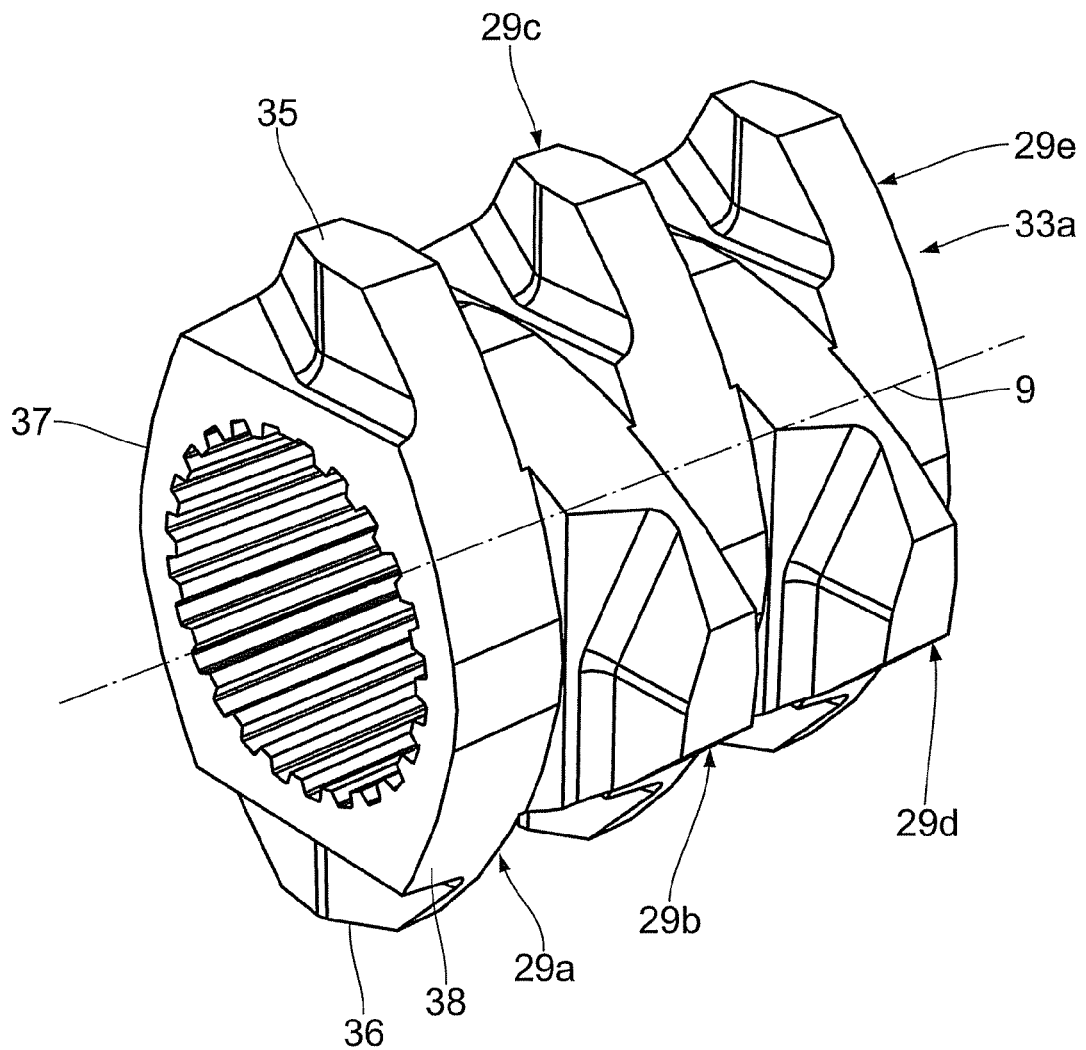
FIG. 6 shows a perspective view of an extension-kneading block of the extruder.
Figure 7:
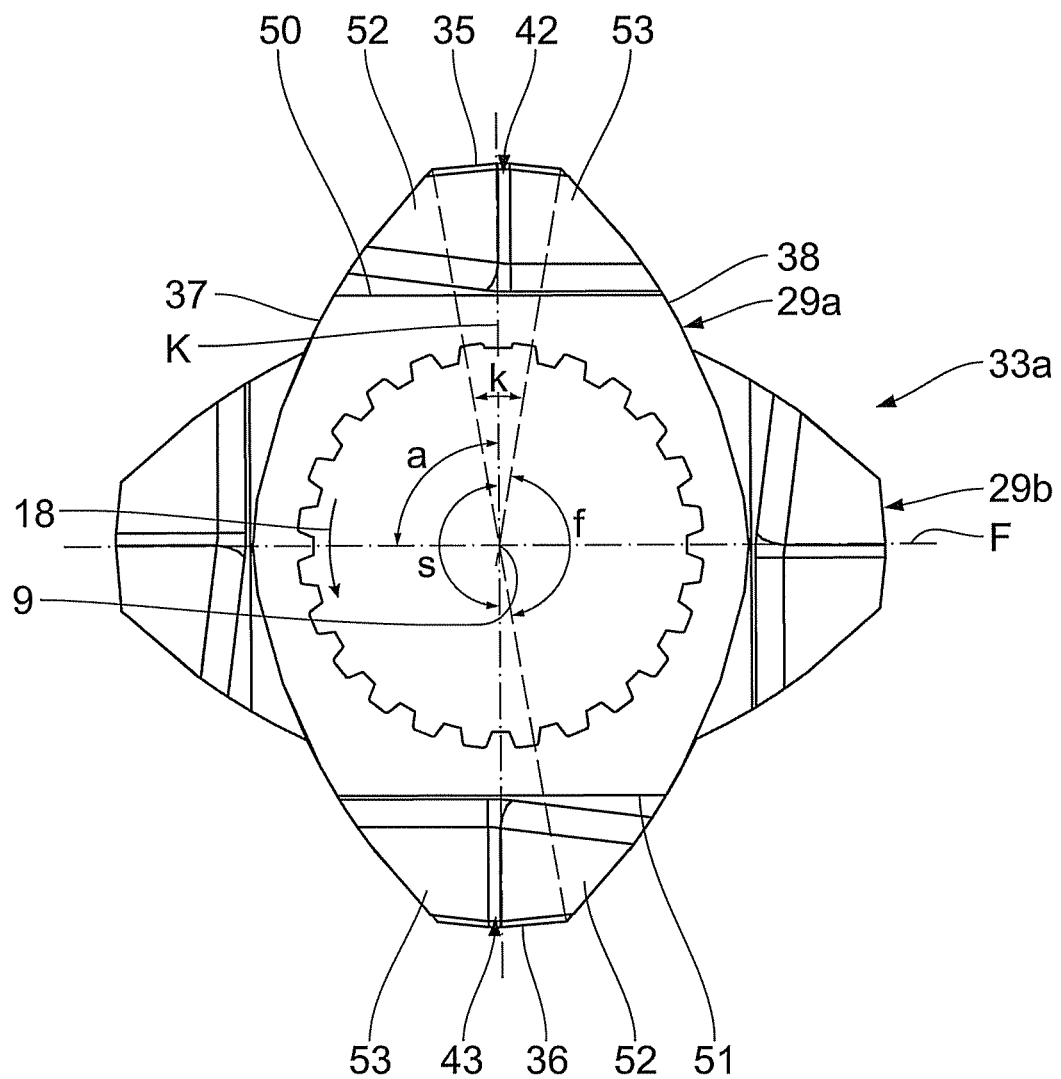
FIG. 7 shows a front view of the extension-kneading block in FIG. 6.

In the rotary position shown in FIG. 5 of the extension-kneading elements 29a to 30j, each of the first extension-kneading elements 29b, 29d, 29f, 29h, 29j forms with the respective corresponding second extension-kneading element 30b, 30d, 30f, 30h, 30j and the second extension-kneading element 30a, 30c, 30e, 30g, 30i preceding them, a first extension channel 54. Furthermore, each of the second extension-kneading elements 30c, 30e, 30g, 30i forms, with the respective corresponding first extension-kneading element 29c, 29e, 29g, 29i and the first extension-kneading element 29b, 29d, 29f, 29h preceding them, a second extension channel 55. In a rotary position rotated in comparison to FIG. 5 through 90° in the directions 18, 19 of rotation, each of the first extension-kneading elements 29c, 29e, 29g, 29i forms, with the respective corresponding second extension-kneading element 30c, 30e, 30g, 30i and the second extension-kneading element 30b, 30d, 30f, 30h preceding them, a first extension channel 54. Furthermore, in the this rotary position, each of the second extension-kneading elements 30b, 30d, 30f, 30h, 30j forms, with the respective corresponding first extension-kneading element 29b, 29d, 29f, 29h, 29j and the first extension-kneading element 29a, 29c, 29e, 29g, 29i preceding them, a second extension channel 55. The crest regions 39, 40, because of the course of the crest region front sides 42, 43, lead to the fact that the formed extension channels 54, 55 taper in the cross section Q counter to the respective direction 18, 19 of rotation. This means that the extension channels 54, 55 taper in the cross section Q in the flow directions 56, 57 of the material. The extension channels 54, 55 accordingly have for the material, an outlet cross section $Q_A$, which is smaller in comparison to an inlet cross section $Q_E$. The flow directions 56, 57 in the region between the triangles 11, 12 are directed counter to the directions 18, 19 of rotation in this region. Accordingly, the flow direction 56 in the first extension channels 54 is directed from the first triangle 11 to the second triangle 12, whereas the flow direction 57 in the second extension channels 55 is directed from the second triangle 12 to the first triangle 11. The flow directions 56, 57 run substantially parallel to the flank center plane F, other words perpendicular to the crest center plane K and tangential to the crests 35, 36.

Figure 8:
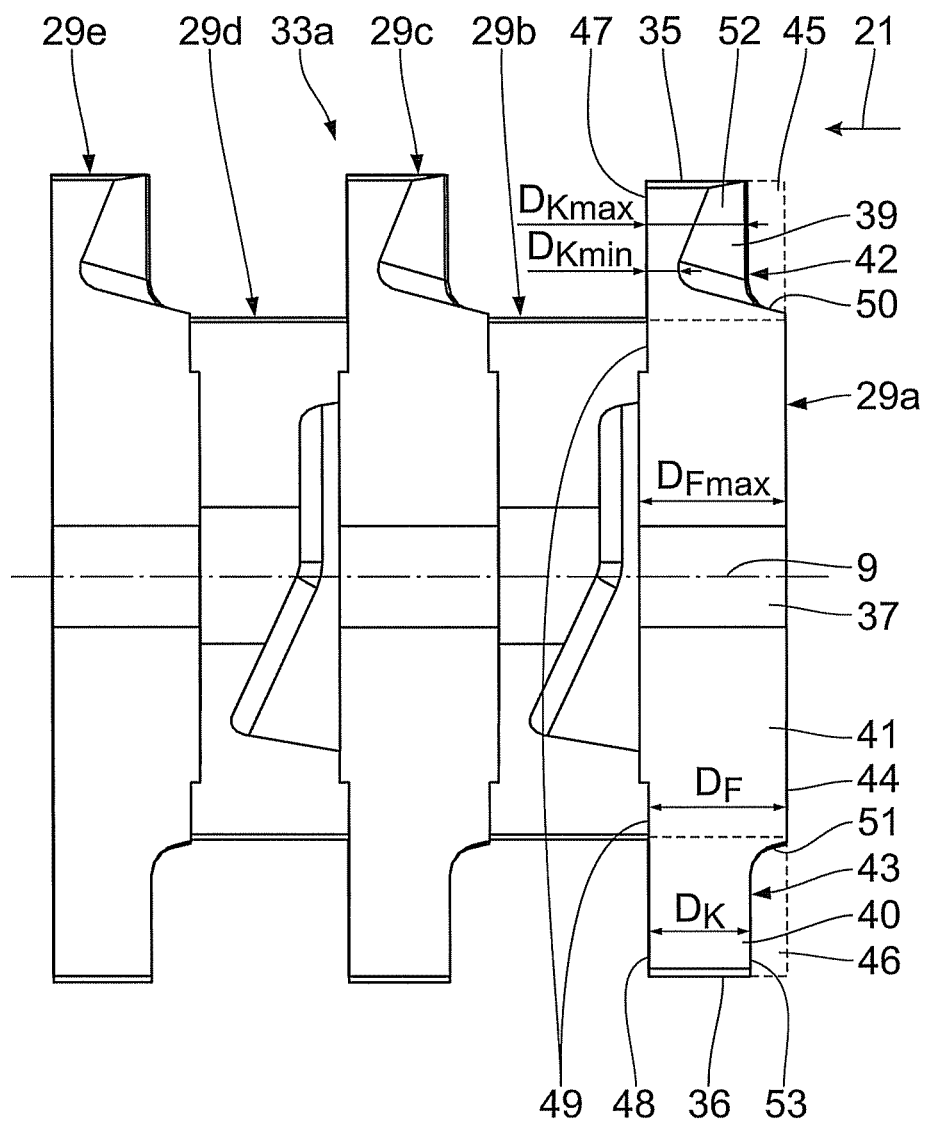
FIG. 8 shows a side view of the extension-kneading block in FIG. 6.

The ratio of the smallest thickness $D_{Kmin}$ to the largest thickness $D_{Kmax}$ in the axial direction in the crest regions 39, 40 is in the range of 1/10 to 9/10, in particular in the range of 2/10 to 8/10, and in particular in the range of 3/10 to 7/10. Furthermore, the ratio of the largest thickness $D_{Kmax}$ in the crest regions 39, 40 to the largest thickness $D_{Fmax}$ in the flank region 41 is in the range of 3/10 to 9/10, in particular in the range of 4/10 to 8/10, and in particular in the range of 6/10 to 8/10. As can be seen from FIG. 8, the ratio of the smallest thickness $D_{Kmin}$ to the largest thickness $D_{Kmax}$ in the present embodiment is about 1/3 and the ratio of the largest thickness $D_{Kmax}$ in the crest regions 39, 40 to the largest thickness $D_{Fmax}$ in the flank region 41 is about 3/4.

The mode of functioning of the extruder 1 is as follows:

The material to be prepared is fed via the material feed 20 into the feed zone 23 and conveyed from there in the conveying direction 21 into the melting zone 24 and onward into the extending-kneading zone 25. The solid material is melted by forced shear flows in the melting zone 24 and the extension-kneading zone 25, said material additionally being subjected in the extension-kneading zone 25 to extension flows, so high-molecular particles of the material are divided because of the extension and the material is thus homogenized. The extension flows are produced in the extension channels 54, 55, where the material is accelerated because of the cross section Q tapering in the respective flow direction 56, 57 and is thus extended. Once the material has been subjected in the extension-kneading zone 25 to shear and extension flows, a pressure build-up takes place in the pressure build-up zone 26 in the material, in order to then discharge the latter through the nozzle plate 22.

The extension-kneading elements 29a to 30j may, in principle, have any desired geometry in the crest regions 39, 40, as long as an extension channel 54, 55 tapering in the flow direction 56, 57 of the materials is formed in the region between the triangles 11, 12. In particular, the crest region front sides 42, 43 may extend partially or completely linearly obliquely or convexly or concavely curved relative to the crest region rear sides 47, 48.

What is claimed is:

1. A screw machine with
    a housing (2),
    two housing bores (7, 8), which
        have mutually parallel axes (9, 10) and
        intersect one another with the formation of triangles (11, 12),
    a first and a second shaft (13, 14), which
        are arranged in the housing bores (7, 8) concentrically with respectively associated axis (9, 10), and
    a plurality of first and second processing elements (27, 28, 29, 30, 31, 32) for processing material, which
        are arranged rotatably fixed in an axial direction one behind the other on the respectively associated first and second shaft (13, 14) and
        are configured tightly meshing with one another,
    wherein
        at least one of the processing elements (27, 28, 29, 30, 31, 32) is configured to extend the material in a flow direction (56, 57) as an extension-kneading element (29, 30),
            a crest region (39, 40) of the extension-kneading element (29, 30) having a thickness ($D_K$) in the axial direction, which is reduced relative to a flank region (41) and a crest region front side (42, 43) facing a material feed (20) is recessed in the axial direction relative to a flank region front side (44),
            the thickness ($D_K$) in the crest region (39, 40) proceeding from a first flank (37) of the extension-kneading element (29, 30) up to a second flank (38) is reduced and the crest region (39, 40), together with adjacent processing elements (29, 30), forming an extension channel (54, 55) for the material in a region between the triangles (11, 12), and
            the crest region (39, 40) being configured to extend the material in the flow direction (56, 57) thereof in such a way that the extension channel (54, 55) tapers in the cross section (Q) counter to a direction (18, 19) of rotation and the extension channel (54, 55) having, for the material, an outlet cross section ($Q_A$) which is smaller in comparison to an inlet cross section ($Q_E$).

2. A screw machine according to claim 1, wherein a crest region rear side (47, 48) remote from a material feed (20) and a flank region rear side (49) align with one another.

3. A screw machine according to claim 1, wherein a crest region base (50, 51) is substantially parallel to a flank center plane (F).

4. A screw machine according to claim 1, wherein the crest region front side (42, 43) is configured obliquely rising counter to the direction (18, 19) of rotation relative to a crest region rear side (47, 48).

5. A screw machine according to claim 1, wherein the ratio of a smallest thickness ($D_{Kmin}$) to a largest thickness ($D_{Kmax}$) in the crest region (39, 40) is in the range of 1/10 to 9/10.

6. A screw machine according to claim 1, wherein the ratio of a smallest thickness ($D_{Kmin}$) to a largest thickness ($D_{Kmax}$) in the crest region (39, 40) is in the range of 2/10 to 8/10.

7. A screw machine according to claim 1, wherein the ratio of a smallest thickness ($D_{Kmin}$) to a largest thickness ($D_{Kmax}$) in the crest region (39, 40) is in the range of 3/10 to 7/10.

8. A screw machine according to claim 1, wherein the ratio of largest thickness ($D_{Kmin}$) in the crest region (39, 40) to a largest thickness ($D_{Fmax}$) in the flank region (41) is in the range of 3/10 to 9/10.

9. A screw machine according to claim 1, wherein the ratio of a largest thickness ($D_{Kmax}$) in the crest region (39, 40) to a largest thickness ($D_{Fmax}$) in the flank region (41) is in the range of 4/10 to 8/10.

10. A screw machine according to claim 1, wherein the ratio of a largest thickness ($D_{Kmax}$) in the crest region (39, 40) to a largest thickness ($D_{Fmax}$) in the flank region (41) is in the range of 6/10 to 8/10.

11. A screw machine according to claim 1, wherein a plurality of extension-kneading elements (29, 30) are arranged directly one behind the other and next to one another on the shafts (13, 14).

12. A screw machine according to claim 11, wherein a plurality of extension-kneading elements (29, 30) are configured in one piece as an extension-kneading block (33, 34).

13. A screw machine according to claim 1, wherein
a first extension channel (54) is configured such that the flow direction (56) in the first extension channel (54) is directed from a first triangle (11) to a second triangle (12), whereas a second extension channel (55) is configured such that the flow direction (57) in the second extension channel (55) is directed from the second triangle (12) to the first triangle (11).

14. A screw machine according to claim 1, wherein
in the extension channel (54, 55) an extension flow is produced and the material is accelerated because of the cross section (Q) tapering in the flow direction (56, 57).

15. A screw machine according to claim 1, wherein the extension-kneading element (29, 30) is configured as a single-flight to triple-flight disc.

16. A screw machine according to claim 15, wherein the extension-kneading element (29, 30) is configured as a double-flight disc.

* * * * *